United States Patent [19]
Anderson et al.

[11] 3,966,128
[45] June 29, 1976

[54] FEED CONTROL FOR TUB TYPE HAY GRINDER

[75] Inventors: Joseph A. Anderson; Chester G. Neukom, both of Jamestown; Ivyl Kopecky, Ypsilanti, all of N. Dak.

[73] Assignee: Haybuster Manufacturing Inc., Jamestown, N. Dak.

[22] Filed: Dec. 5, 1974

[21] Appl. No.: 529,918

[52] U.S. Cl. ........................... 241/73; 241/101.7; 241/186.2
[51] Int. Cl.² ..................................... B02C 13/286
[58] Field of Search .......... 241/101.7, 101 B, 186.2, 241/101.6, 222, 225, 73

[56] References Cited
UNITED STATES PATENTS

| | | | |
|---|---|---|---|
| 2,650,745 | 9/1953 | Oberwortman | 241/225 X |
| 3,186,651 | 6/1965 | Briolini | 241/186.2 |
| 3,743,191 | 7/1973 | Anderson | 241/101.7 X |
| R23,903 | 12/1959 | Moore | 241/186.2 |

*Primary Examiner*—Granville Y. Custer, Jr.
*Attorney, Agent, or Firm*—Dugger, Johnson & Westman

[57] ABSTRACT

A feeding control for regulating the feeding of hay or other forage crops into a grinder of the "tub" type wherein a large hopper or tub is used for feeding the forage into a rotating cylinder adjacent the bottom of the tub, and wherein the forage or hay crop is moved across the cylinder for grinding. The feed control comprises a slidable cover plate member that regulates the size of the effective inlet opening to the cylinder to control the amount of forage which can contact the cylinder at any one time.

8 Claims, 4 Drawing Figures

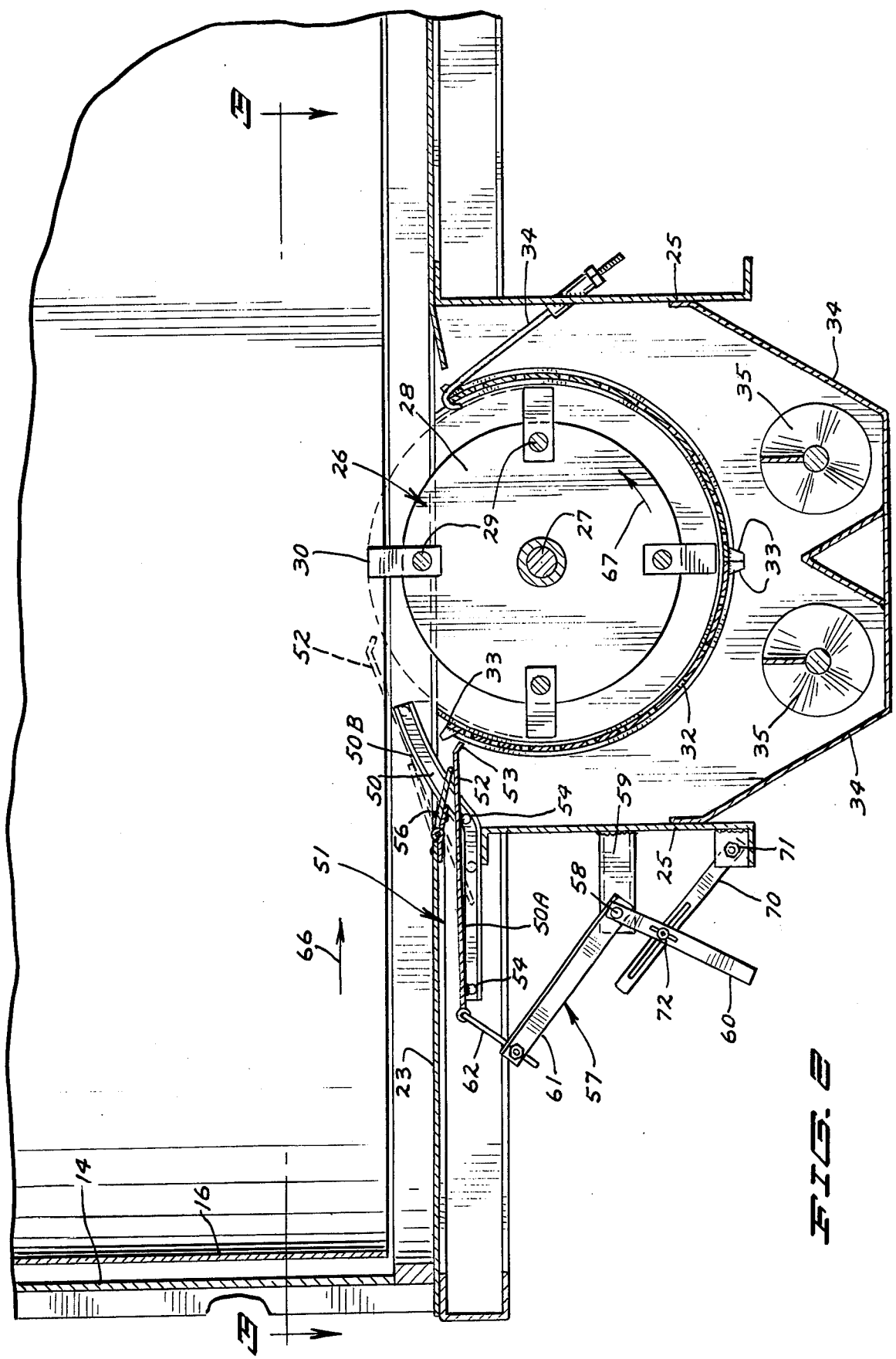

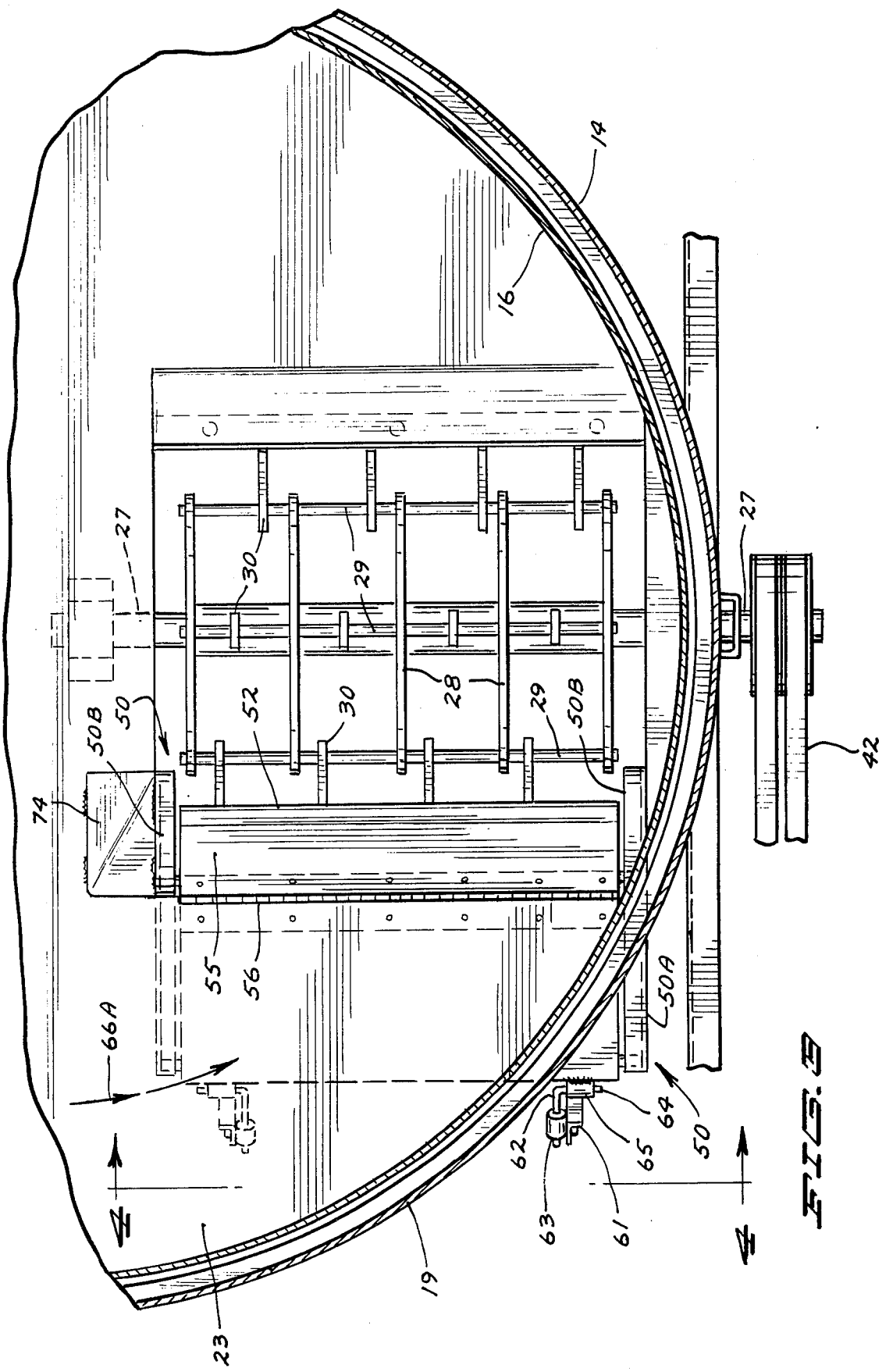

FEED CONTROL FOR TUB TYPE HAY GRINDER

BACKGROUND OF THE INVENTION

1. Field of the Invention

The present invention relates to feeding controls for forage grinders.

2. Prior Art

The use of forage crop grinders comprising large tubs which rotate about a vertical axis and which move the forage across a rotating cylinder has expanded in recent years. The type of grinder has been known for many years, and is typically illustrated in U.S. Pat. No. 2,650,745 to W. H. Oberwertman, dated Sept. 1, 1953.

The grinding cylinders are generally fixed as to the area of the cylinder exposed to the forage crop, and any feed rate change is accomplished by varying the speed of rotation of the feeding tub. However, in many instances this variable speed is expensive to make, and does not permit controlling the feed rate with sufficient precision to keep the grinder operating at maximum efficiency in all types of forage crops.

Feed controls for different types of grinders or choppers also are known. For example, U.S. Pat. No. 2,696,330, in FIG. 5 shows an adjustable gate which is used for regulating the feeding of granular materials from a hopper into a type of rotating cylinder which is used for spreading material.

U.S. Pat. No. 1,688,770 issued to H. G. Woodhead on Oct. 23, 1928 shows a type of adjustable gate for a feed control on a cereal cutting machine. The gate is a type of slide that is manually adjusted to regulate the size of an opening from a hopper into the cylinder. The gate is used in combination with a hopper that has a rectangular discharge opening leading to the cylinder. In the tub grinder, there is no such hopper that has a discharge opening leading into a cylinder chamber, but as will be explained, the forage crop or hay is moved across the top of a rotating cylinder that protrudes into the hopper area.

SUMMARY OF THE INVENTION

The present invention relates to a feed control mechanism for use with forage grinders of the so-called rotating tub type, wherein forage is placed in the large hopper or tub that has an opening in the bottom thereof, with a cylinder for grinding the forage extending through the opening partially into the hopper area. The forage is moved by a rotating tub feeding member, and is thus moved over the grinding cylinder during feeding. The improvement described herein comprises a plate member that moves on tracks to permit covering portions of the cylinder exposed to the hopper to shield portions of the cylinder to restrict the feeding of material into the cylinder.

The feed control therefore closes off a portion of the effective area of the cylinder for restricting the amount of material that is in contact with the cylinder, and therefore restricting the amount of material that is ground.

A false floor portion is utilized in the regular floor to provide a smooth transition between the stationary floor and the movable feed plate. The controls for the feed control plate are external of the machine, so that the rate of feed can easily be adjusted to suit existing conditions.

BRIEF DESCRIPTION OF THE DRAWINGS

FIG. 2 is a fragmentary sectional view taken as on line 2—2 in FIG. 1;

FIG. 3 is a top plan view of the cylinder and feed control shown in FIG. 2; and

DESCRIPTION OF THE PREFERRED EMBODIMENT

Figure 1:
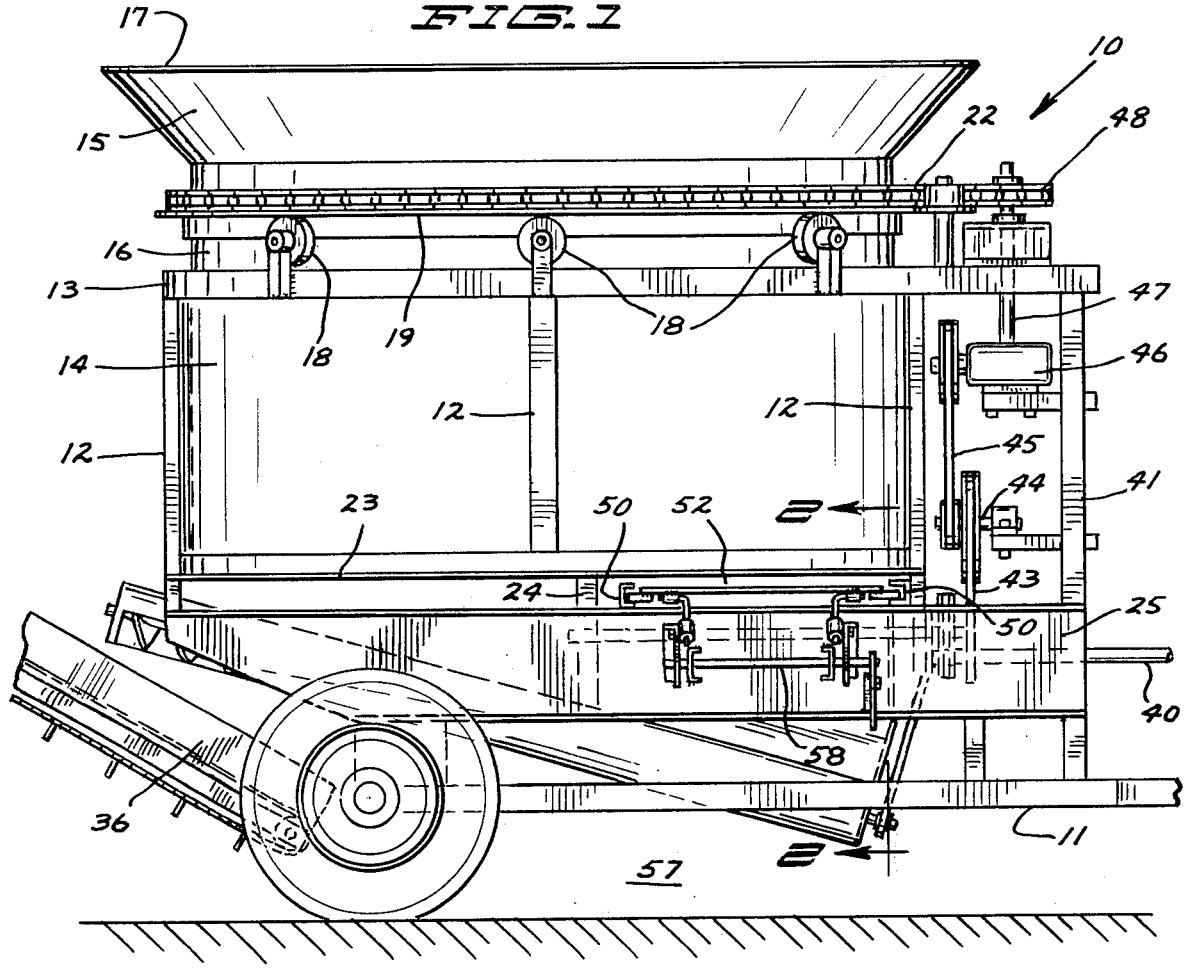
FIG. 1 is a side elevational view of a typical grinder with the feed control of the present invention installed thereon.

Referring generally to FIG. 1, a tub type forage grinder indicated generally at 10 is of the type shown in U.S. Pat. No. 2,650,745 with some changes in the conveyors for carrying away the ground forage, and also in the drive mechanism. However, the general principle of operation is the same as that shown in the aforesaid U.S. Pat. No. 2,650,745, and therefore the showing contained herein is schematic in regard to the overall grinder construction.

The grinder has a frame 11, which includes upright members 12, and an annular member 13. The members 12 and 13 carry an outer wall or housing 14 that is substantially circular in plan view, and into which a rotating tub member 15 is placed. The tub member 15 has a peripheral wall 16, and an outwardly tapered portion 17 at the top part thereof. The tub member 15 is supported on suitable rollers 18 mounted onto the annular member 13. The rollers engage a flange 19 on the tub member and support it in a relation spaced from the outer wall 14 of the frame.

The tub member can have a large sprocket or drive member around the periphery thereof, and this is driven by a chain 22 which is used for rotating the tub about an upright axis. A main support floor 23 is joined to the wall 14 and, as shown, the floor 23 is supported on suitable cross members 24.

The frame 11 includes also a pair of main fore and aft extending side support plates 25, 25 which are immediately below and connected to the cross members 24, and which are supported on the lower portion of the frame through suitable braces. A forage grinding cylinder assembly illustrated generally at 26 (see FIG. 2) is positioned between the side plate 25, 25 at the front of the hopper. The cylinder assembly 26 has a center shaft 27 that is rotatably mounted in suitable bearings supported on cross members 24. The mounting of the cylinder is conventional in tub type grinders. The cylinder assembly 26 is a swinging hammer type cylinder. The shaft 27 has a plurality of axially spaced radially extending plates 28 fixed thereto. Hammer shifts 29 are mounted on the plates, and suitable hammers 30 are mounted on these shafts. The hammers 30 are free swinging hammers and when the cylinder shaft 27 is rotating, the hammers will swing radially out as shown in FIG. 2.

The forage material is ground as it is moved across the upper portions of the cylinder, which as shown in FIG. 2 extend above the floor plate 23, and the material is ground through a conventional screen 32 that is made in two sections that are supported in a part cylinder track at each end in a conventional manner. The screen sections have stop lugs 33 that hold the first section in position and the second section is held tightly against the first section with holding rods 34. Ground material passes through the screen sections and down to a pair of auger conveyors 35. Augers 35 are used for removing the ground material, and can discharge the material into another conveyor 36 as shown in FIG. 1, for removal to the desired location. There is a tapered divider wall between augers 35 as shown.

The components are driven generally from the power take-off of a tractor, and in this particular instance the drive components are shown schematically for simplicity inasmuch as they are conventional. A power shaft 40 can be driven from a tractor power take-off, and is mounted in suitable bearings relative to forward upright members 41 of the frame. Shaft 40 in turn drives shaft 27 through a suitable drive 42 such as multiple V-belts 42 or a chain and sprocket. A separate belt drive indicated generally at 43 is used to drive a jack shaft 44. A speed reducer pulley assembly (large input, small output) on shaft 44 provides an output drive to a belt 45 which in turn drives a worm gear box 46 that has an output shaft 47 extending uprightly to drive a sprocket 48 that in turn drives the chain 22 to rotate the tube 15 during the grinding operation.

These drives are only shown schematically as stated because they are of conventional design.

Figure 4:
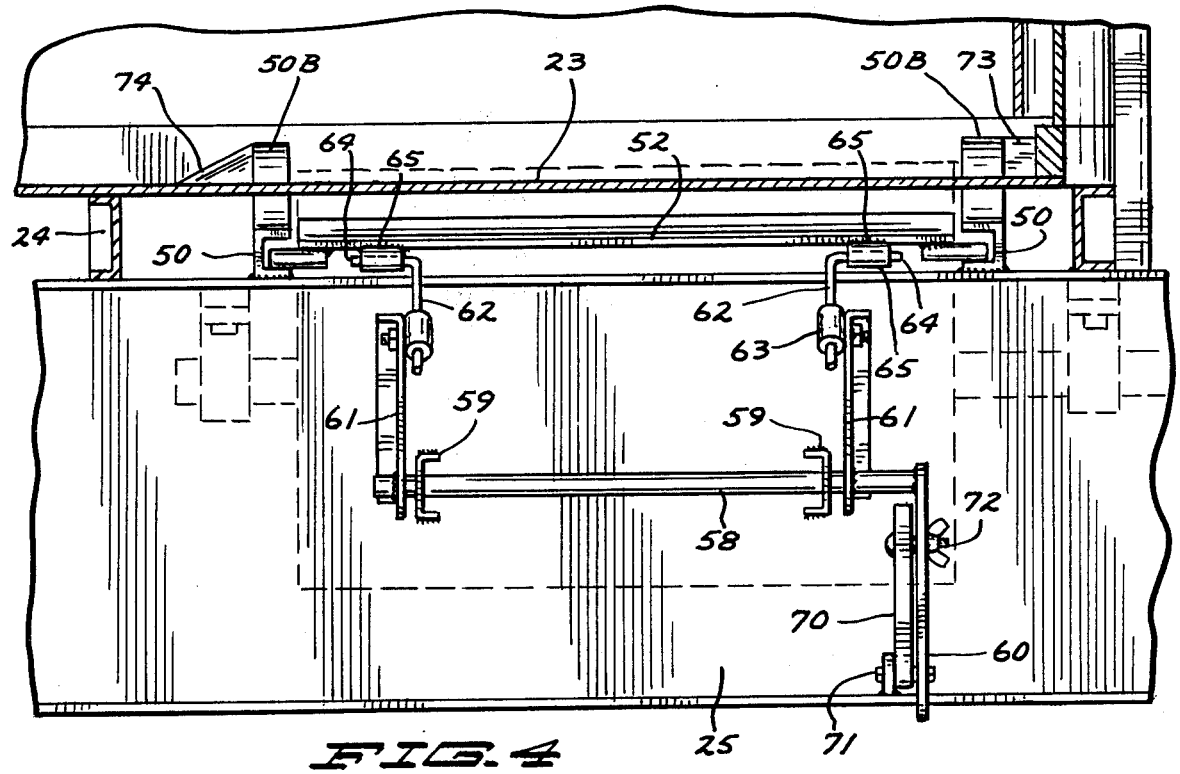
FIG. 4 is an enlarged side elevational view of the feed control adjustment mechanism.

Referring specifically to FIGS. 2, 3 and 4, where the details of the feeding mechanism are shown, it can be seen that portions of the floor 23, which is stationary with respect to the frame, is cut away a distance from the in feed edge of the cylinder. The hammer tip diameter is shown in dotted lines in FIG. 2 and it can be seen that there is a gap in the floor, and a pair of track members 50 are positioned in and extend through this gap. The tracks are mounted to the side walls 25, and to other suitable supports on the frame, as desired. The tracks are spaced in axial direction of the cylinder and are on opposite sides of the opening for the cylinder, as can be seen in FIG. 3. The tracks are generally U-shaped in cross section, with top and bottom legs, and a vertical side wall. The open ends of the "U" shape face each other (see FIG. 4). The tracks as shown have a lower straight section 50A, and an upper angled or curved section 50B extending above portions of the cylinder. The tracks may be straight throughout their length if desired, and mounted at a suitable angle to have portions overlying the cylinder.

The feed control mechanism illustrated generally at 51 includes a plate member 52 having a bent end lip portion 53 in the form shown. The plate 52 has four slider guide pins 54 mounted thereon. There are two pins at the rear of the plate on opposite sides of the plate as perhaps can best be seen in FIGS. 3 and 4, and two pins in the midportions of the plate, which also protrude outwardly beyond the edges of the plate. These pins are of size to fit within and be received between the upper and lower legs of the track members 50 and to be guided thereby. The pins thus form track carriages for supporting the plate member.

A hinged false floor plate guide 55 is hingedly mounted as at 56 along an edge of the floor 23 with a suitable hinge, and as shown merely rests down onto the upper surface of the plate 52. In some forms this hinge plate 55 can actually rest on the track members so that it would not move unless the upper surface of the plate raised above the track members.

The movement of the feed control plate 52 along the tracks 50 is controlled by a manual adjusting linkage indicated generally at 57. This manual linkage includes a torque shaft 58 suitably pivotally mounted in brackets 59 which extend from the side plate 25, and which has a handle 60 mounted thereon for manual control of the torque shaft about its axis. The torque shaft in turn has actuating arms 61 mounted thereon in a fixed relationship thereto so that when the shaft is pivoted by moving handle 60 the arms 61 will also pivot about the axis of the shaft. The torque arms each control a link 62 that is mounted to the arms 61 through a pivoting bracket 63 that also provides for adjustment along the longitudinal length of the associated link 62. The brackets 63 pivot with respect to the arms 61 about the axis of the mounting bolt that is shown, and these links 63 have the offset legs that are pivotally mounted in suitable hubs or housings 65 attached to the rear edge of the feed control plate 52.

It can be seen that the track portions 50A are positioned below the fixed floor 23, and are spaced apart on the exterior of the machine. When the feed plate is in its maximum feed position as shown in FIG. 2, the feed plate is actually below the level of the floor 23, and the hinge plate 55 forms a transition surface between the floor 23 and the lip portion 53 of the feed control plate. Hay is fed in the direction that is indicated by the arrow 66 at the forward portions of the machine in that the tub is rotating about an upright central axis. The direction of rotation of the tub is indicated by the arrow 66A in FIG. 3. The cylinder, however, is rotating as indicated by the arrow 67 in FIG. 2, and thus the edge of lip portion 53 of the feed control plate, which is parallel to the cylinder axis, forms a shear bar for the hammers so that hay that is being moved across the cylinder as shown by the arrows 66 and 66A will be cut off and sheared at the edge of the feed control plate as the member rotates.

The handle or control lever 60, as shown can be fixed in its position using a slotted adjustment bar 70 that is pivotally mounted as at 71 to a bracket and is attached to the control handle 61 through a suitable bolt assembly 72. Loosening the bolt 72 and swinging the handle upwardly from its position shown will cause the torque shaft to rotate, and the arm 61 to push on the links 62 forcing the feed control plate to move along the tracks 50 to a desired position as guided by pins 54. The pins 54 in track 50 guide the plate from a minimum position as shown in dotted lines in FIG. 2 wherein the upper edge of the feed control plate is substantially on a horizontal level with the peripheral diameter described by the outer ends of the swinging hammers 30, and overlies portions of the cylinder, to a maximum feed position shown in solid lines. The minimum feed position permits very little feeding of hay into the cylinder, while full feed is achieved in the maximum feed position. Any intermediate position of course can be achieved by desired adjustment.

The upper portions 50B of the tracks, as shown, protrude above the floor 23. At the forward track, adjacent the front of the machine, a transition piece 73 blends the front end track in with the fixed tub side wall, and at the rear track, suitable sheet metal guide walls indicated generally at 74 can be used to prevent hay from snagging on the track members.

In operation, the feed control can be readily adjusted, as desired. The primary advantage comes in using the power available for driving the grinder to its maximum efficiency. In wet hay, for example, the tendency of the hay to bunch together and to "slug" the cylinder and in this way stop it, is much greater than with dry hay. By controlling the feed plate member, the amount of hay that can be fed into the cylinder is limited so the slugging possibility is reduced, and even with limited power input the grinder can be made to continue to operate in a satisfactory manner.

With the track 50 positioned as shown, and formed as shown, the outer edge of end portion 53 of feed control plate 52 generally follows the arc described by the hammer tips in operation. However, a straight track can be utilized if desired so that even though the edge of the portion 53 of the feed control plate may not follow the arc of the hammer tips exactly, it will follow it sufficiently well to achieve the purposes of limiting the amount of hay or forage that can be fed into the cylinder so that the feed can be controlled.

The hinge plate 55 that is utilized prevents hay from being forced out between the floor 23 and the feed control plate 52, and also it helps to form a gentle feed angle from the floor 23 to the feed control plate particularly when the feed control plate is in its minimum feed position as shown in dotted lines in FIG. 2.

The use of the feed control plate provides for more precise control of the feeding of the hay or forage into the cylinder than control of the rotational speed of the tub 15.

What is claimed is:

1. In combination with a forage grinder having a hopper with a stationary wall, and a grinding cylinder having grinding means protruding through a provided opening in said stationary wall into said hopper, and feed means for moving forage material to be ground along said wall and across a forage input side of said grinding means, the improvement comprising an adjustable plate member mounted in relation to said wall adjacent to said cylinder and on the forage input side of said cylinder and protruding from said wall to deflect forage material moving along said wall, and means to permit movement of said plate member between at least two positions wherein the plate member deflects forage material in said hopper being moved toward said cylinder by said feed means in a direction to limit the amount of the forage material coming into contact with said grinding means protruding into said hopper by a different amount in each position as the forage material passes over the cylinder, said plate member remaining spaced apart from the axis of said cylinder an amount greater than the maximum diameter of said grinding means when said plate member is moved between said positions.

2. The combination as specified in claim 1 and track means for guiding the movement of said plate member between said two positions.

3. The combination as specified in claim 1 wherein said cylinder is rotated about an axis, and said plate member has an edge generally parallel to said axis and extending substantially along the entire axial length of said cylinder.

4. In combination with a forage grinder having a hopper with a stationary wall, and a grinding cylinder having grinding means protruding through a provided opening in said stationary wall into said hopper, and feed means for moving forage material to be ground along said wall and across a forage input side of said grinding means, the improvement comprising an adjustable forage feed control member capable of deflecting forage material moved thereover mounted in relation to said wall adjacent to said cylinder and on the forage input side of said cylinder, and track means to guide said feed control member between at least two positions wherein said feed control member permits different amounts of material in said hopper being moved toward said cylinder by said feed means to come into contact with said grinding means protruding into said hopper as the forage material passes thereover, said track means to guide said feed control member guiding movement of said feed control member from a position where said feed control member does not substantially protrude into said hopper beyond said stationary wall member to a second position wherein said feed control member protrudes beyond said wall member into said hopper a distance substantially equal to the amount of protrusion into said hopper of said grinding means.

5. In combination with a forage grinder having a hopper with a floor, and a grinding cylinder having grinding means protruding through a provided opening in said floor into said hopper, and feed means for moving forage material to be ground along said wall and across a forage input side of said grinding means, comprising a rotating tub wall mounted in said hopper for rotation about a substantially vertical axis, the improvement comprising an adjustable plate member mounted in relation to said wall adjacent to said cylinder and on the forage input side of said cylinder, and means to permit movement of said plate member between at least two positions wherein said plate member permits different amounts of material in said hopper being moved toward said cylinder by said feed means to come into contact with said grinding means protruding into said hopper as the forage material passes thereover.

6. The combination of claim 5 and track means having an end portion raised above said floor, guide means fixed to said plate member and mounted in said track means to guide said plate member to a position wherein the plate member extends upwardly from said floor and overlies a portion of said cylinder.

7. The combination of claim 6 wherein said adjustable plate member extends through an opening in said floor, and a hinge plate pivotally mounted to said floor at an edge of said opening for the adjustable plate member on a side of said adjustable plate member opposite from the cylinder, said hinge plate extending to engage said adjustable plate member.

8. A feed adjustment device for a forage grinder having a hopper with a stationary flow, a rotary grinding cylinder having grinding means protruding into the hopper through a provided opening in said floor, feed means for moving the forage material to be ground along said floor and across said grinding means, said feed adjustment device comprising an adjustable plate member having an edge generally parallel to the axis of rotation of said grinding means and positioned to the side of said cylinder toward the forage material being moved into the cylinder by said feed means, means to mount said adjustable plate member in relation to said floor with the edge adjacent said cylinder, and for movement from a first position wherein the adjustable plate member does not substantially interfere with movement of forage material across the grinding means to a second position wherein the adjustable plate member projects outwardly from said floor to shield the adjacent side of said cylinder from forage material moved by said feed means, and means to adjustably secure said adjustable plate member in selected locations along said means to mount.

* * * * *

UNITED STATES PATENT AND TRADEMARK OFFICE
CERTIFICATE OF CORRECTION

PATENT NO. : 3,966,128
DATED : June 29, 1976
INVENTOR(S) : Joseph A. Anderson et al.

It is certified that error appears in the above-identified patent and that said Letters Patent are hereby corrected as shown below:

Column 2, line 54 "shifts" should be--shafts. Column 6, line 47 (Claim 8, line 2) "flow" should be--floor--; Column 6, line 63 (Claim 8, line 18) "outwardly" should be--upwardly--.

Signed and Sealed this

Third Day of May 1977

[SEAL]

Attest:

RUTH C. MASON
*Attesting Officer*

C. MARSHALL DANN
*Commissioner of Patents and Trademarks*